J. B. REEVE.
BEAN CUTTER.
APPLICATION FILED NOV. 6, 1912.
1,201,500.
Patented Oct. 17, 1916.
2 SHEETS—SHEET 2.
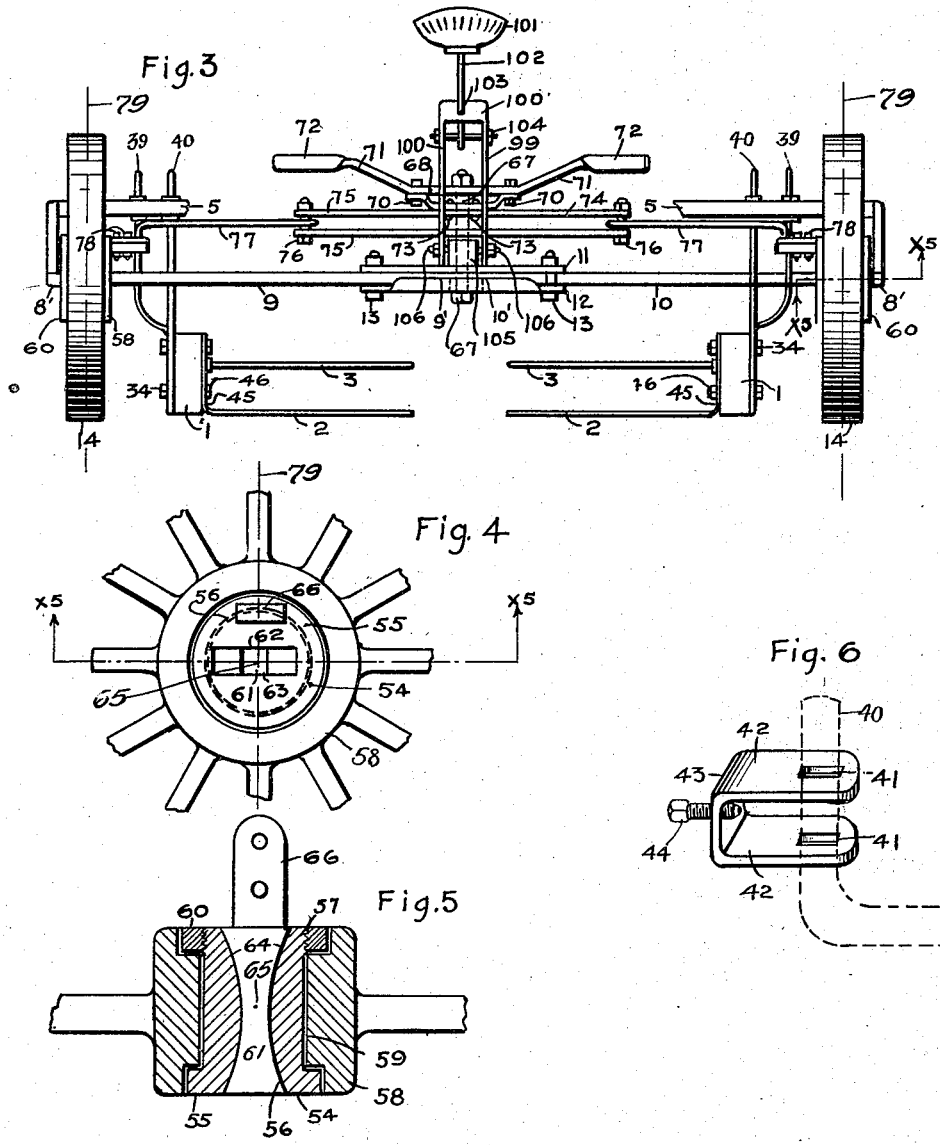
Witnesses:
Inventor:
John B. Reeve

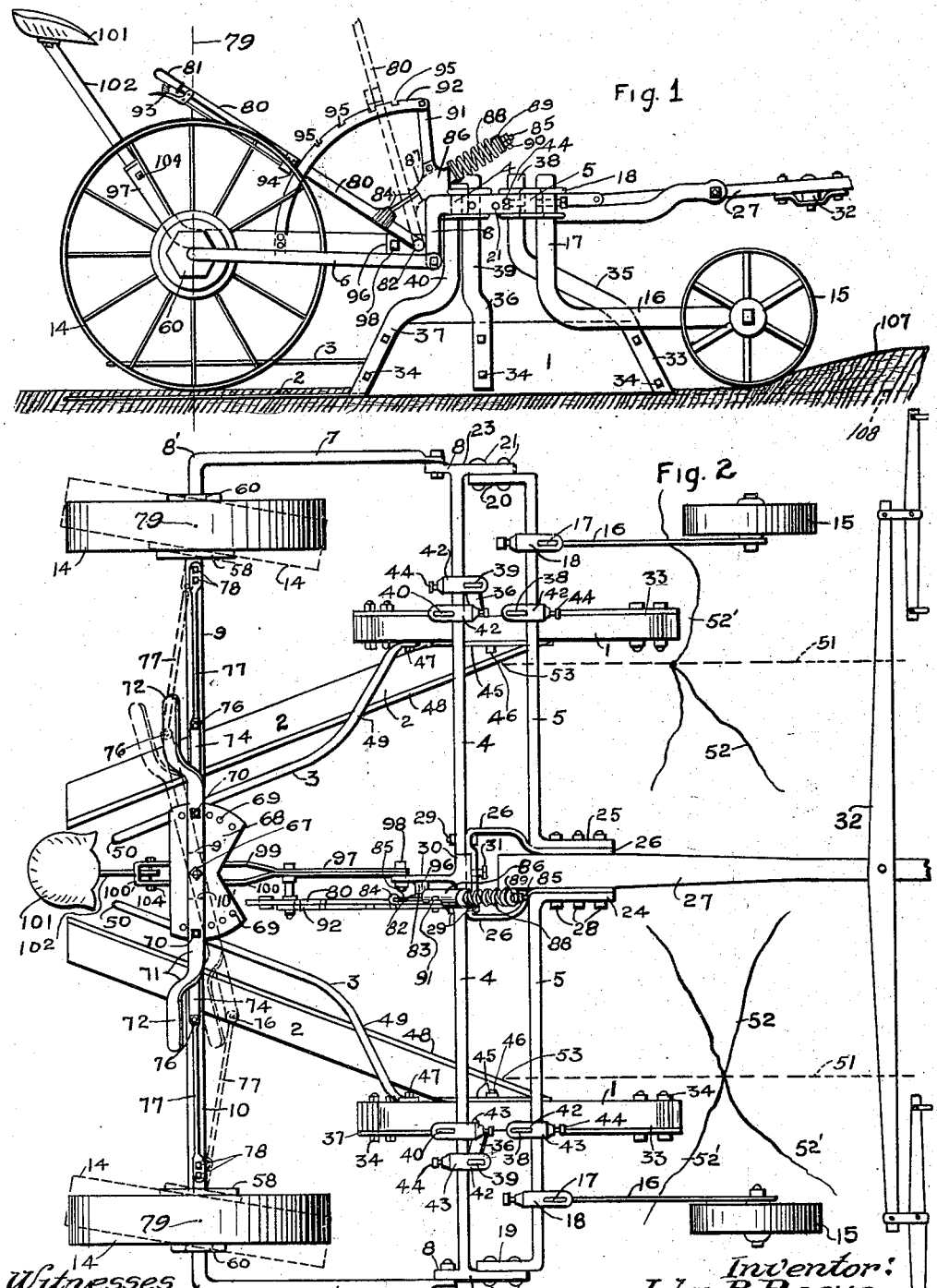

UNITED STATES PATENT OFFICE.

JOHN B. REEVE, OF LA MIRADA, CALIFORNIA.

BEAN-CUTTER.

1,201,500.  Specification of Letters Patent.  Patented Oct. 17, 1916.

Application filed November 6, 1912. Serial No. 729,898.

*To all whom it may concern:*

Be it known that I, JOHN B. REEVE, a citizen of the United States, residing at La Mirada, in the county of Los Angeles and State of California, have invented a new and useful Bean-Cutter, of which the following is a specification.

Certain varieties of beans, including limas and others, grow on low-spreading vines planted across a field in rows, the distance between the rows varying from 25 to 35 inches approximately, according to the soil's fertility and other conditions lying within the knowledge of the planter. These beans are usually cut by an implement comprising a two-wheeled farm truck drawn by horses and adapted to naturally bridge over two bean rows. To this truck in advance of and between the wheels are attached two vertical shoes carrying flat inwardly and rearwardly extending bean cutting blades, the planes of which are horizontal; and said shoes also carry rearwardly extending bean guides above and behind the cutting edge of said blades. The shoes, having their lower edges running slightly below the soil's surface and just outside the bean rows, are constructed with a rearwardly inclined forward edge adapted to reach beneath the outer branches of the vines and to raise and turn them inward; and to facilitate this operation it is desirable that the shoes should run as close to the bean rows as possible.

The cutting blades are adapted to run somewhat below the soil's surface, because the shaking and threshing of the ripe bean from the vine is minimized when the blades are so positioned. After the vine has been turned inward and cut as aforesaid the rearwardly extending guides convey it toward and discharge it from the center of the truck leaving a windrow behind as the truck travels along. The two wheels of the truck are mounted on a shaft in the ordinary manner and the steering, effected by guiding the horses, is quite cumbersome and lacks a rapid and responsive action. In operating these old types of bean cutters the following inconveniences and objectionable features are frequently encountered: When cutting beans planted horizontally along a hill the two-wheeled truck tends to constantly slide sidewise down the slope, thus unduly crowding one shoe close to its row and unduly removing the other shoe from its row, so that the outer vines of one row are not properly turned inward and the vines of the other row are damaged by the shoe. Again, the shoes are similarly crowded onto and away from the rows, either when the horses are startled and side-step or when they deviate naturally and slightly from their straight course, or when the rows themselves deviate from their straight line, it being difficult to steer the horses with sufficient delicacy to always maintain the proper relation of the truck to the rows. Again, these old bean cutters are each suitable for rows planted apart one certain distance only, there being no provision for substantially varying the distance between the shoes and blades. It is obvious that a particular implement cannot operate where the distance between the rows is greater than the distance between the shoes, and though the implement may possibly operate when the distance between the rows is less than that to which the implement is adapted the cutting will be quite unsatisfactory, since the outer vines cannot be properly turned inward. This unsatisfactory operation becomes more pronounced with the increase in the variation from the row width to which the implement is adapted. Again, the forward edges of the vertical shoes, traveling in advance of the two wheels of the truck, will plow excessively deep into the soil when a transverse row or hillock is encountered in the field. Thereby the draft is so increased by this frequently occurring action that three to five horses are necessary to draw the truck. Again, in the old form of cutters the beans are partially buried while passing along the bean guides toward the windrow; and later when men with pitchforks pile the beans, this burial will cause the forks to pull through the vines threshing quantities of beans into the field and effecting considerable loss. Again, the old forms of bean cutters are provided with two independently operable levers, one for each of the shoes, said levers being separately manipulated when drawing the cutter onto a road or other point where it is desired to raise the shoes and blades out of the soil. The separate operation of these levers is difficult for a person who is driving at the same time.

This invention relates to a novel bean cutter wherein the foregoing objections and inconveniences are obviated and may be built in accordance with the unitary construction hereinafter disclosed. I have discovered, however, that a novel bean cutting attachment may be attached to any standard form of beet or bean cultivator after the cultivating knives have been removed, and by combining said attachment and said cultivator the bean cutter embodying my invention is constructed.

An object of my invention is to provide a bean cutter which may be easily operated on a hillside, the tendency of the implement to slide sidewise down the slope being counteracted by guiding the rear supporting wheels which are dirigibly mounted on the trucks. By this provision also it becomes possible to set the shoes very close to the bean row because the shoes can be very accurately guided along the bean rows, irrespective of the natural deviation of the horses or their accidental side-stepping.

Another object is to provide a bean cutter which will operate with equal and complete satisfaction irrespective of the varying distances at which the bean rows are planted. This result is attained principally by adjustably mounting the cutting blades on a cross frame running transversely of the truck, so that the blades may be set apart from each other at any desired distance within the range of the implement.

Another object is to provide a bean cutter wherein the draft shall be materially reduced. This result is attained principally by adding two forward pilot supporting wheels to the truck frame in addition to the usual rear supporting wheels. By this provision the shoes and knives will not plow unduly deep into the soil at points where transverse rises or hillocks are encountered, and accordingly my cutter may be drawn by two horses, each expending no more effort than is required from each of the three or more horses on the old forms of bean cutters. Since two horses will move faster than a greater number, especially around turns, it is clear that my bean cutter will handle a greater acreage per day than is handled by the old forms of bean cutters.

Another object is to avoid the partial burying of the beans while being guided toward the center of the truck and this result is attained by so disposing the bean guide with respect to the cutting blade that the vines will be windrowed before the burying action occurs.

Another object is to effect a material saving in the expense of farming equipment, and this result is attained by providing a cheap bean cutting attachment which may be mounted on any standard bean or beet culivator thus producing the unitary bean cutter embodying my invention as hereinafter described. By this provision the farmer owning a cultivator may avoid the heavy expense of an additional bean cutter by merely securing the cheap bean cutting attachment hereinafter more particularly pointed out.

Another object is to provide a bean cutter wherein the shoes and cutting blades may be raised from the soil by a single operation; and this result is attained by mounting both shoes on a cross frame which may be bodily raised or lowered by a single lever.

Another object is to provide for the convenient shifting of the blades, so that the normal cutting point may be varied. Since the blade ultimately becomes dull at the point where the vines are being cut it is very advantageous to be able to shift this normal cutting point onto a new and sharp portion of the blade.

The following figures illustrate my invention: Figure 1 is a side elevation of my bean cutter showing the shoes and blades running below the surface of the soil and showing also the forward pilot truck wheels about to rise over a transverse hillock. Fig. 2 is a plan of same, the rear dirigible supporting wheels being shown in one position by full lines and in another position by dotted lines. This figure also indicates the relation of the bean rows to the shoes and cutting blades and schematically indicates an average bean vine spreading from each row. Fig. 3 is a rear elevation of same showing the mechanism whereby the rear dirigible wheels are guided. Fig. 4 is a fragmental viw of the hub of either rear dirigible supporting wheel viewing it from the inner side of the truck and showing the special bearing whereby the dirigible mounting of the wheel is attained. In this view the wheel has been removed from its square axle. Fig. 5 is a section along line $x^5$—$x^5$ in Fig. 4, looking in the direction of the arrow. Fig. 6 is a detail view of the adjustable clamping means whereby the upright standards of the bean cutting attachment may be adjustably secured to the cross frame of the truck. The dotted lines indicate one of said standards in position through the clamp.

The bean cutter essentially comprises a truck and a novel bean cutting attachment, the latter consisting of two shoes 1 having blades 2, bean guides 3, and attaching standards to be later described. The truck is built up of a main frame having two square rods 4 and 5 running transversely of the cutter and forming the cross frame already referred to; the said main frame having also the rearwardly projecting rods 6 and 7 extending from the downwardly projecting arms 8 of the rod 4. These rods 7 and 6 are bent inward at 8' to form the two square axles 9 and 10, the ends 9' and 10', Fig. 3, of which are secured together by the upper and lower cover plates 11 and 12 by means of bolts 13. The rear supporting wheels 14 are mounted on the square axles 9 and 10 in such manner that their plane is adapted to rotate somewhat around a vertical axis passing through the center of the wheel, said rotation being accomplished without any substantially shifting of said axis with respect to the frame of the truck and the term "dirigible," used in this description and in the appended claims, refers to any wheels so mounted and to none other. The means whereby the dirigible wheels 14 may be steered or guided will be described later.

The forward supporting pilot wheels 15 are mounted on standards 16 terminating in uprights 17 and to the upper portion of said uprights are attached clamps 18 whereby said uprights and pilot wheels are fastened to the transverse rod 5. The rod 5 is formed in two portions each having a rearward projecting portion 19 and 20 attached by any suitable means 21 to the forward projections 22 and 23 of rod 4; and each portion of said rod 5 also has forward projecting portions 24 and 25 between which lie the strap 26 and tongue 27, all rigidly connected together by bolts 28. Strap 26 is attached to the square rod 4 by bolts 29 between which bolts the strap straddles the steel casting 30 more particularly described below, the set screw 31 serving to bind said casting securely onto the rod 4. The strap 26 also binds rods 4 and 5 of the cross frame together and this serves to reinforce the same. The tongue 27 carries the whiffle tree 32 of ordinary construction and adapted to harness the truck onto a two-horse team.

The forward edge of the vertical shoes 1 is inclined upwardly and rearwardly as at 33 and to said shoes are also attached, by any suitable means 34, the standards 35, 36 and 37, each terminating respectively in the vertical uprights 38, 39 and 40, Fig. 1. The standards are so formed that upright 38 will rise within the cross frame on the rear side of rod 5 (see Fig. 2); and that the upright 39 will rise within the cross frame on the forward side of rod 4; and that the upright 40 will rise without the cross frame on the rear side of rod 4. These uprights pass through the apertures 41 in the two shanks 42 of the clamping means 43 best shown in Fig. 6, these clamps serving to adjustably fasten the shoes and uprights onto the rods 4 and 5 of the cross frame. The shanks 42 of these clamps are adapted to straddle the square transverse rods 4 and 5 of the cross frame and a screw 44 may be set hard against said transverse rod, forcibly compressing same onto the rear edge of the upright in aperture 41 so as to effect a secure attachment between the same.

To the inner sides of shoes 1 are attached the horizontal rearwardly and inwardly extending blades 2, each having an upward projecting portion 45 through which pass the bolts 46 attaching the said blades to shoes 1. As is best seen in Fig. 2 the horizontal and rearwardly discharging bean guides 3 are also attached to shoes 1 by bolts 47, the point of attachment being located behind the adjacent portion of the cutting edge 48 of blades 2. From this figure also it is seen that the bean guide is bent sharply at its point of attachment to the shoe and passed ahead of the cutting edge 48 at the point 49 from whence said bean guide continues in advance of said cutting edge and terminates at its discharging point 50.

The dotted lines 51 in Fig. 2 indicate the row along which beans are planted and the scrawly lines 52 indicate schematically the spreading branches of the bean vine extending from each row.

When adjusting the bean cutter for the particular row width between the lines 51, the set screws 44 of the clamping means 42 are loosened so that the shoes may be slid on rods 4 and 5 of the cross frame until the inner edges of said shoes lie approximately four inches beyond the bean rows 51. While making this transverse adjustment the shoes and blades may at the same time be vertically adjusted to a proper depth beneath the surface of the soil by sliding the uprights 38, 39 and 40 vertically through the apertures 41 of the clamping means 42. After the correct transverse and vertical position of said knives and shoes have been attained set screws 44 are fastened and the bean cutter is ready for operation.

As the horses draw the implement forward the rearwardly inclined forward edge 33 of shoes 1 will raise the outer branches 52' and turn same over and inward toward the center of the implement, and as the blades 2 advance the beans will be cut below the surface at the normal cutting point 53 on the blade. The bean guide 3 will then convey the severed vines toward the center of the cutter and discharge same into a central windrow which will trail out behind the implement between the discharging points 50. Both the turning of the outer branches and the cutting will be best effected when the shoe is placed close to the row 51 and by dirigibly mounting the rear supporting wheels 14 the operator is assured of such rapid and responsive steering action that the shoes 1 may be run exceedingly close to the row without danger of plowing into same, when the horses deviate naturally and slightly, or sidestep accidentally. By having the normal cutting points 53 close to the shoe the knife also is subject to minimum strain and vibration.

As the blades 2 trail beneath the surface a peculiar sliding and rolling motion is imparted to the soil above the same, this motion seeming to possess a combined inward and rearward component. In the bean cutters as previously constructed the rearwardly extending guides 3 are placed behind the cutting edge 48 along the whole length. In this position the inward motion of the vines along the guide, together with the rolling motion of the earth above the blade, combine to partially bury the vine, this feature resulting later in considerable loss. When the beans are piled by men using pitchforks a considerable threshing of the ripe bean is effected, due to the hold that the burying earth has upon the vine, the fork of the operator often pulling and threshing through the vine in endeavoring to lift the partially buried branches. With the particular form of bean guide disclosed above it is clear, however, that the cut vine is rapidly guided ahead of the cutting edge 48 passing beyond same at the point 49, from whence the vine is guided into the windrow over the quiet soil ahead of the blade and avoids the burying action above referred to by avoiding the rolling soil over the blade. The advantage of thus windrowing the beans before they are buried secures a substantial saving in the final harvest. After the normal cutting point 53 has severed a considerable number of vines it will ultimately become dull, and whereas considerable delay is often encountered by re-sharpening the blades of the old types of bean cutters when in this condition this delay may be postponed or completely obviated by adjusting the shoe along the cross frame, so that the actual cutting point may be changed on the edge 48.

Referring now to the means whereby the rear supporting wheels 14 are dirigibly mounted and guided on the square shaft 9 attention is directed to the internal bearing 54 shown in Figs. 4 and 5. This internal bearing is provided at one end with a cylindrical collar 55 behind which the bearing is turned down forming the cylindrical drum 56 having the screw-threaded extremity 57. The hub 58 of wheel 14 has a cylindrical aperture 59 suitably formed to surround and revolve upon the cylindrical drum 56, the hexagonal nut 60 being fastened onto the threaded extremity 57 of bearing 55 after the wheel hub 58 has been positioned on said bearing. The characteristic feature securing dirigibility, however, resides in the rectangular longitudinally flared aperture 61 of said bearing. As is best shown in Fig. 4 this aperture is formed above and below by the parallel horizontal walls 62 and 63 and, as is best shown in Fig. 5, by the doubly flared side walls 64. When the square axles 9 or 10 are passed through aperture 61 the upper and lower walls 62 and 63 will restrain said bearing from rotation about any horizontal axis whereas the flared walls 64 will permit said bearing to rotate somewhat about a vertical axis passing through the geometrical center 65 of said bearing and providing the dirigible feature previously referred to. The bearing is formed with a projecting lug 66 to which suitable means now to be described are connected for dirigibly rotating the bearing and wheel 14.

Rising through plate 12 and between the extremities 9' and 10' of axles 9 and 10, Fig. 3, is the bolt 67, and centrally mounted on this bolt lies the pedal plate 68, Fig. 2. This pedal plate is provided with a series of apertures 69 through which pass bolts 70 attaching to said plate the bar 71 having the steering pedals 72 at its extremities, the series of apertures 69 being provided so that bolts 70 may be passed through those apertures which best adapt the pedal position to the length of the operator's legs. To the lower portion of the pedal plate 68 is rigidly attached, by any suitable means 73, a cross piece 74 comprising the flat upper and lower bars 75 united at their extremities by the bolt pins 76. Connecting rods 77 embracing pins 76 at one end are each rigidly connected by any suitable means 78 to the projections 66 of bearing 54. When the operator from his position turns the foot pedal 72 and pedal plate 68, the rotation will be transmitted through the cross-piece 74 and pins 76 to the connecting rods 77 thereby rotating the wheel 14 into the dotted position shown in Fig. 2, said rotation being about a central vertical axis 79, Figs. 1 and 3. This axis passes through geometrical center 65 of the bearing and wheel and remains substantially fixed with respect to the main truck frame while said rotation is in progress.

In driving the bean cutter the operator watches only one bean row and its adjacent shoe, so that when the horses deviate normally or sidestep accidentally he operates foot-pedal 72 so as to guide the truck by means of the rear dirigible wheels 14 and thus avoids plowing shoes 1 into the parallel and uniformly spaced bean rows; or when driving on a hillside the operator continuously crowds the wheels 14 so as to guide them up the slope, thus counteracting the normal sideward and downward sliding action of the truck.

In order that the transverse rods 4 and 5 comprising a cross frame may be raised so as to elevate shoes 1 and blades 2 from the soil, the bean cutter is provided with a lever 80 having a handle 81 at one extremity and pivoted at its other extremity 82 to a projection 83 of the steel casting 30. Adjacent the extremity 82 this lever is formed with a boss 84 from which rises a bolt 85. This bolt passes through the upward projection 86 of the casting 30 said projection also having a boss 87 on its lower side adapted to coöperate with boss 84 on the lever; and on the outer side of bolt 85 is mounted a heavy spring 88 bearing at one end on the projection 86 and being restrained at its other end by washer 89 and the double nut 90.

From the projection 86 rises the quadrant frame 91 carrying the notched quadrant 92. The lever carries a spring-operated handle 93 adapted to manipulate the latch 94, which is adapted to catch in the notches 95 of the quadrant and securely hold the lever by the same. To another projection 96 of the steel casting 30 is secured the seat bar 97 by means of a bolt 98. The lower extremity of quadrant 92 is supported on this seat bar by bolt 98, Fig. 2, said bolt serving at the same time to bind together the two portions 99 and 100 of the seat bar. The seat bar portions 99 and 100 are continuous and are yoked together at the outer extremity 100. The seat proper 101 is carried on a rectangular bar 102 which passes through a rectangular aperture 103 through the yoke 100′ indicated in Fig. 3, the seat bar being held in position by a bolt 104 passing through said bar 102 and the seat bar portions 99 and 100. As is seen best in Fig. 3 these seat bar portions straddle the cylindrical projection 105, integrally formed on plate 11 and are rigidly attached to same by means of studs and nuts generally referred to as 106. These side bar portions, fastened to projection 105, thus secure rigid connection between the seat bar and the axles 9 and 10.

It will be noticed that the weight of the operator sitting in the seat 101 and acting through bars 99, 100 and 102 will fulcrum about the axles 9 and 10 and largely counterbalance the weight of the cross frame, the shoes and the blades attached at the other end of bar 98. When it is desired to raise said shoes and blades from the surface of the soil the operator projects lever 80 forward until the boss 84 of the lever contacts with boss 87. Any further force now applied to the handle 81 will re-act through the seat 101 to overbalance the weight of the cross frame, shoes and blades, and will serve to raise same off the surface together with the pilot wheels 15. In this condition the truck will be supported by the supporting wheels 14 at one end and by the collar of the horse attached to the truck tongue at the other end.

Fig. 1 shows the pilot wheels of the truck about to rise onto the transverse hillock 107 and it is clear that the shoes and blades will be maintained substantially at the same depth below the soil's surface as the truck rises onto said hillock. If the forward pilot wheels were omitted, however, the shoes and blades would plow in a path substantially represented by the dotted lines 108, and this would be particularly true if hillock 107 were short so as to lie completely between the rear supporting wheels and the point at which the tongue is supported by the horses. Obviously such uselessly deep plowing, which is common in ordinary forms of bean cutters, will increase the draft very considerably.

It has been previously stated that the bean cutter embodying this invention can be built by combining the truck of modern standard bean or beet cultivators with a novel bean cutting attachment. The bean cutting attachment referred to comprises shoes 1, blades 2, bean guides 3, standards 35, 36 and 37 and the corresponding means for adjustably attaching said standards to the transverse rods 4 and 5. When it is desired to reconvert the aforedescribed bean cutter into a standard bean or beet cultivator it is merely necessary to remove this bean cutting attachment and by means of clamps 43 to fasten cultivator blades, not shown, to the rods 4 and 5. Where a ranch equipment therefor already contains such a costly cultivator the cheap bean cutting attachment above described need only be added to the equipment in order to procure my novel unitary bean cutter. It will thus be seen that the truck operates in one manner to produce one result when in combination with the cultivator blades; and that it operates in a somewhat different manner and to produce another result when in combination with the bean-cutting attachment. Obviously, by so constructing and adapting the bean-cutting attachment that the same may be used in combination with the truck of the cultivator, a very considerable expense is saved by avoiding the duplication of said truck.

The foregoing description fully discloses the invention and the mode of using the same.

I claim:—

1. A bean cutter comprising a frame having two parallel cross rods extending from side to side of the frame, two bean cutting blades extending rearwardly aslant toward one another, shoes fastened at their rear ends to the forward ends of the blades, standards attached to the forward and rearward ends of the shoes, clamps adjustably attaching the forward standards to one of the cross rods, and other clamps adjustably attaching the rearward standards to the other cross rod.

2. A bean cutter comprising a frame having two parallel cross rods extending from side to side of the frame, one in front of the other, two bean cutting blades extending rearwardly aslant toward one another, shoes fastened at their rear ends to the forward ends of the blades, front standards attached to the forward ends of the shoes, rear standards attached to the rear ends of the shoes, intermediate standards attached to the shoes between the front and rear standards, clamps adjustably attaching the front standards to the front rod, and other clamps adjustably attaching the rear and intermediate standards respectively to the rear rod.

3. A bean cutter comprising a frame having two parallel cross rods extending from side to side of the frame one in front of the other, two bean cutting blades extending rearwardly aslant toward one another, shoes fastened at their rear ends to the forward ends of the blades and adjustably connected at their forward and rearward ends to the front and rear cross rods respectively, and front and rear wheels to support the frame, said front wheels being adjustably connected to said front cross rod.

In testimony whereof, I have hereunto set my hand at Los Angeles, California, this 31st day of October, 1912.

JOHN B. REEVE.

In presence of—
JAMES R. TOWNSEND,
ROBERT A. STEPS.

Copies of this patent may be obtained for five cents each, by addressing the "Commissioner of Patents, Washington, D. C."